United States Patent [19]

Kaldor

[11] Patent Number: 5,745,958
[45] Date of Patent: May 5, 1998

[54] CABLE-BUNDLING BAND

[76] Inventor: Alan Kaldor, P.O. Box 801, Tesuque, N. Mex. 87574

[21] Appl. No.: 839,906

[22] Filed: Apr. 18, 1997

[51] Int. Cl.⁶ .......................... B65D 63/00; H01R 13/00
[52] U.S. Cl. .................. 24/16 R; 24/16 PB; 24/17 A; 24/30.5 P; 439/371
[58] Field of Search .................. 24/16 R, 17 A, 24/16 PB, 17 AP, 30.5 P, 3.13, 306, 442; 439/371

[56] References Cited

U.S. PATENT DOCUMENTS

| 2,096,351 | 10/1937 | Semonsen | 24/17 A |
| 3,197,830 | 8/1965 | Hoadley | 24/16 PB |
| 4,229,924 | 10/1980 | Teachout, Sr. | 24/16 R |
| 5,075,933 | 12/1991 | Kemper | 24/306 |
| 5,133,671 | 7/1992 | Boghosian | 439/371 |
| 5,502,877 | 4/1996 | Yocum | 24/30.5 P |
| 5,581,850 | 12/1996 | Acker | 24/30.5 P |

*Primary Examiner*—Victor N. Sakran
*Attorney, Agent, or Firm*—Myron Amer PC

[57] ABSTRACT

A rectangular band disposed in a closed loop about a cable coiled in a hank to facilitate the handling and storage of the hank when the cable is not in use. The band has two adjacent longitudinal slits through which a cable end is projected to hold the band on the cable when it is used and also so it is readily handy to again bind the cable after its use into a hank. In its position on the hank, the band holds the end of the cable projected through the slits in the same plane as the hank and thus provides a flat, compact condition in the hank and in the cable end that is favorable for handling and storage.

1 Claim, 1 Drawing Sheet

U.S. Patent    May 5, 1998    5,745,958
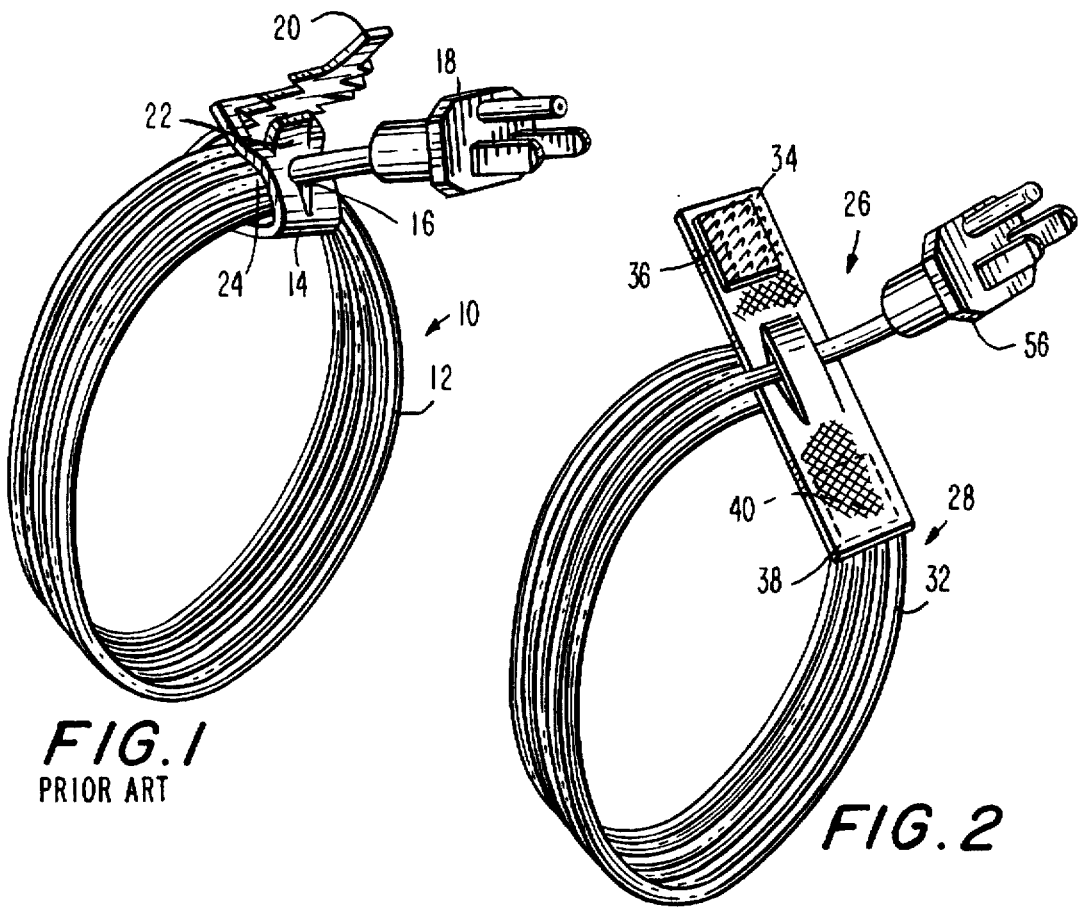
FIG. 1
PRIOR ART
FIG. 2
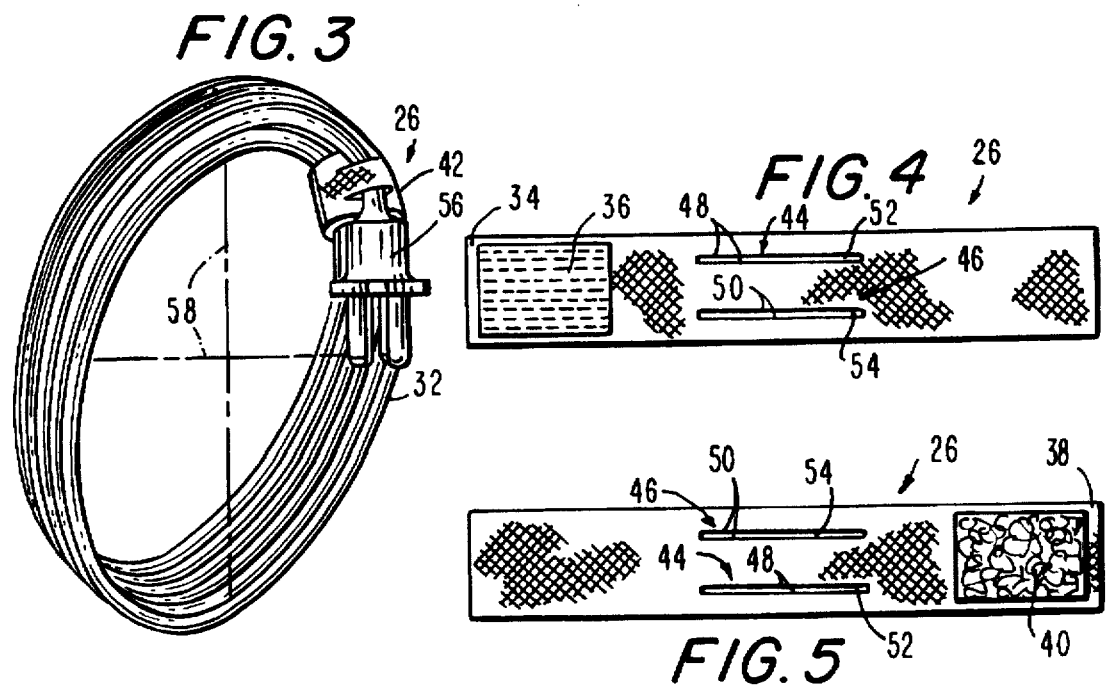
FIG. 3
FIG. 4
FIG. 5

5,745,958

CABLE-BUNDLING BAND

The present invention relates generally to improvements for a cable-bundling band, the improvements more particularly holding the cable in a hank in a flat, compact condition facilitating the handling and storage of the cable when not in use.

EXAMPLES OF THE PRIOR ART

When coiled or placed in a hank, a lengthy cable does not tangle and cable-bundling bands to achieve this benefit are already well known, as exemplified by U.S. Pat. No. 4,229,924 issued to Teachout, Sr. for "Gripping Device and Method" on Oct. 28, 1980, and U.S. Pat. No. 5,133,671 issued to Boghosian for "Combined Lock for Electrical Connectors and Cable Keeper" on Jul. 28, 1992, to mention two of plural prior patents. As best shown in FIG. 6 of Boghosian, the band is joined end-to-end in a closed loop about the cable hank and, having first a cable end inserted in a single slot longitudinally of the band, there is an attachment achieved between the cable and band which holds the band onto the cable. The cable-encircling band is prevented from inadvertently slipping off the end of the cable by a twist configuration induced in the cable by reason of the cable end being projected transversely of the cable hank.

While generally useful for the purposes intended the single slot bands of the noted prior patents and all other known cable-bundling bands, do not provide an optimum flat and compact condition in the cable hank.

Broadly, it is an object of the present invention to provide improvements in a cable-bundling band overcoming the foregoing and other shortcomings of the prior art.

More particularly, it is an object to provide a band which maintains its location of use without slippage along the cable hank and has the cable end and hank in the same plane to contribute to a flat, compact storage condition thereof, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is a perspective view of a cable coiled in a hank and held in this condition using a prior art cable-bundling band;

FIG. 2 is a perspective view similar to FIG. 1, but illustrating the within inventive cable-bundling band;

FIG. 3 is a view from a similar perspective as FIG. 2, but illustrating the band in a closed loop encircling condition about the cable hank FIG. 4 is an elevational view of one side of the within inventive cable-bundling band; and FIG. 5 is an elevational view of the opposite side of the band.

It is a common experience in the handling of lengthy cables, such as occurs with musicians using amplifiers, computer users, video technicians, stereo buffs, electricians, and even home owners, to suffer the inconvenience of untangling the cable prior to use. Consequently, there is in use cable-bundling bands to maintain the cable coiled in a hank to facilitate the handling of the cable when not in use by providing a storage condition of the cable that does not necessitate any untangling, the aforesaid being exemplified by FIG. 1 illustrating a cable generally designated 10 coiled in a hank 12 to which there is attached a bundling band 14 having a single slot 16 oriented lengthwise of the band 14, and wherein an end of the cable, in the example illustrated being the plug end 18 is projected through the slot 16, after which the band 14 is adapted to be formed into a closed loop in encircling relation in a transverse orientation about the hank 12, and cooperating connecting means 20 and 22 then joined to each other to hold the band 14 in its hank-encircling condition. It is to be noted that because the cable-encircling condition of the band is transverse to the cable length, the single slot 16 twists the cable end 18, as at 24, in a 90 degree bend, and the cable plug end 18 is consequently projected out of the flat plane of the hank 12.

Underlying the present invention is the recognition of the noted non-aligning plug end 18 and hank 12 shortcoming of the noted and all other known cable-bundling prior art bands, and the solving, using the within inventive band 26, of this shortcoming, as well as providing other noteworthy benefits, such as maintaining the band 26 attached to a cable 28 when the cable is being used as intended, such that the attached band is not lost as might be the case if unattached, and the band also is convenient to be used again when the cable end use is terminated and the cable is to be coiled in a hank 32 to provide a compact and flat condition for facilitated storage.

Referring to FIGS. 2–5, the within inventive cable-bundling band 26 is of a rectangular shape of reinforced fabric or plastic construction material, preferably commercially available from Cooley Incorporated of Pawtucket, R.I., measuring in a preferred embodiment six inches by one inch, having adjacent one end 34 facing in one direction an adhesively attached VELCRO loop fastener patch 36 and having adjacent its opposite end 38 and facing in an opposite direction an adhesively attached VELCRO hook fastener patch 40, the patches 36 and 40 being connected face-to-face to form the band 26 into a closed loop in encircling relation about the hank 32, as noted at 42 in FIG. 3.

Completing the construction of the band 26 are two spaced-apart and adjacently positioned slits 44 and 46 extending longitudinally of the band, and each slit 44, 46, respectively having edges 48 and 50 bounding an opening 52 and 54 correspondingly oriented lengthwise of the band. In use, an end of the cable 28, again by way of example being the plug end 56, is projected through the openings 52 and 54 which positions the plug end 56 transverse to the long dimension of the band 26. Thus, when the band 26 is encircled about the hank 32 transverse to the length of the cable 28, this has the desirable result of aligning the plug end 56 with the length of the cable 28 or, stated otherwise, of locating the cable end 56 in the same plane 58 as that of the hank 32, all to the end of providing a flat, compact storage condition to the cable hank 32.

Additionally to be noted is that the area 60 between the slits and 46 is in firm engagement in covering relation over the cable so that the cable-encircled band 26 retains its location 42 about the hank 32.

While the cable-bundling band herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. Improvements in a cable-bundling band of a type positioned in encircling relation about a hank of a cable to facilitate the handling thereof when not in use, said embodied improvements of said cable-bundling band comprising a rectangular band having two spaced-apart and adjacently located slits extending longitudinally of said band and each slit having edges bounding an opening oriented lengthwise of said band for receiving therethrough an end of said cable, an end of said cable having an operative position projected through said slit openings for attaching to said end of said cable said band in a transverse relation to said end of said cable, and cooperating patches of VELCRO hook and loop fasteners disposed in opposing directions on opposite ends of said band, said patches being adapted when said cable is coiled in a hank to form said band in a closed loop in encircling relation thereabout, said hank having a diameter in a plane aligning with said end of said cable, whereby both said cable hank and said end of said cable are held by said band in a flat condition when not in use, and when in use said band is maintained on said cable by said operative position thereof projected through said two slit openings.

* * * * *